Oct. 27, 1936.  C. M. TUTTLE  2,058,532
EXPOSURE CONTROL FOR CAMERAS
Filed Sept. 18, 1934

Inventor
Clifton M. Tuttle,
By
Attorneys

Patented Oct. 27, 1936

2,058,532

UNITED STATES PATENT OFFICE 2,058,532

EXPOSURE CONTROL FOR CAMERAS

Clifton M. Tuttle, Rochester, N. Y., assignor, by mesne assignments, to Eastman Kodak Company, Jersey City, N. J., a corporation of New Jersey Application September 18, 1934, Serial No. 744,472

5 Claims. (Cl. 88—16)

This invention relates to photographic apparatus and particularly to apparatus for indicating to an operator of a photographic camera whether or not the proper exposure is being made.

Ordinarily, a scene to be photographed is of an ephemeral nature and cannot later be retaken if it is discovered that an improper exposure was made. It is highly desirable that the operator know in advance that the proper exposure is being made and this, whether a still or motion picture camera is used.

It is an object of my invention to provide an arrangement whereby the operator of a camera may measure the exposure required and by so doing will automatically set the exposure which is to follow.

Another object of my invention is to provide a camera with means operative to introduce a distinctive color change in the view finder system whenever the camera is not adjusted to give the proper exposure.

Other objects and advantages of my invention will be apparent from the following description when read in connection with the accompanying drawing in which.

My invention is equally applicable to either still or motion picture cameras but since the cost of motion picture film makes an improper exposure quite expensive and since it is generally impossible to retake a particular action, the invention will be described as applied to a motion picture camera.

Figures 1, 4:
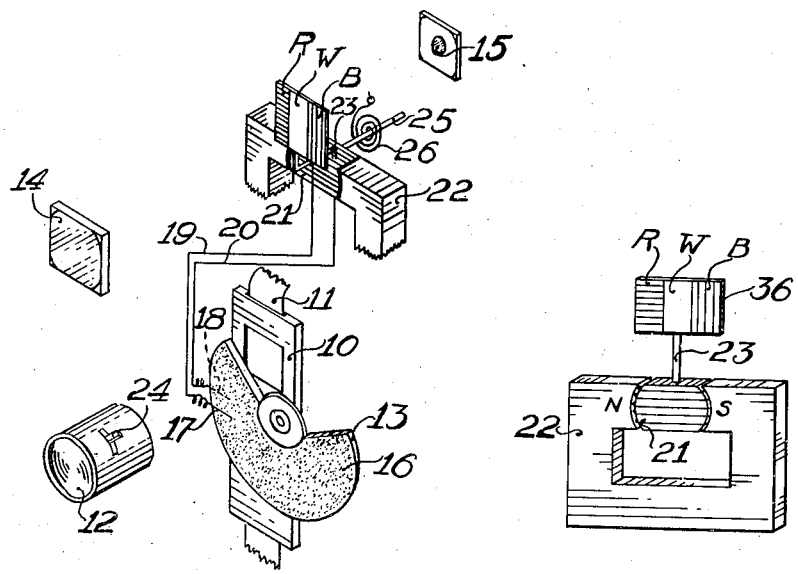
Fig. 1 is a diagrammatic view in perspective showing the essential parts of a mechanism made in accordance with the invention.
Fig. 4 shows diagrammatically and in perspective the meter element and colored vane employed in the apparatus of Fig. 2.

In Fig. 1 I have shown a motion picture camera with all unnecessary parts removed as comprising a gate 10 for supporting a film 11 in the focal plane of an objective 12 and behind a shutter 13 which controls the exposure time in a well known manner. The camera is preferably provided with a suitable view finder which may consist of the usual field lens 14 and an ocular 15.

For proper exposure, it is desired to obtain on the film 11 a predetermined amount of light from the object to be photographed. This condition is obtained by means of my invention by coating the front surface of shutter blade 13 with a suitable photo-sensitive compound 16 which will generate an electromotive force under the influence of light. A current from the resulting photo cell is taken off by suitable brushes 17 and 18 and conducted by leads 19 and 20 to the coil 21 of an indicating meter provided with the usual permanent magnet 22. The meter coil 21 has a pointer 23 which carries a transparent vane 36 consisting of three differently colored bands R, W, and B, which may be red, white and blue, respectively. This transparent vane 36 is positioned in the light beam passing through the view finder and serves to introduce a color change into this beam when the deflection of the pointer 23 is greater or less than a predetermined amount which corresponds to the proper light intensity for correctly exposing the film 11.

The light sensitive cell 16 is activated by light transmitted by the camera objective 12. Any well known diaphragm having an adjusting lever 24 may be employed for regulating the intensity of the light falling on the cell 16 and when the scene as viewed through the finder is white, that is, natural, the diaphragm will be properly adjusted for making an exposure. If the scene appears red the diaphragm is too small and if blue the diaphragm is too large.

It will of course be understood that the red and blue bands of the meter vane may be any desired color or colors and if desired may be opaque in which case the diaphragm will be properly adjusted whenever the scene is visible through the view finder.

The meter coil 21 will of course be suitably mounted on a shaft 25 and provided with the usual biasing spring 26.

Figures 2, 3:
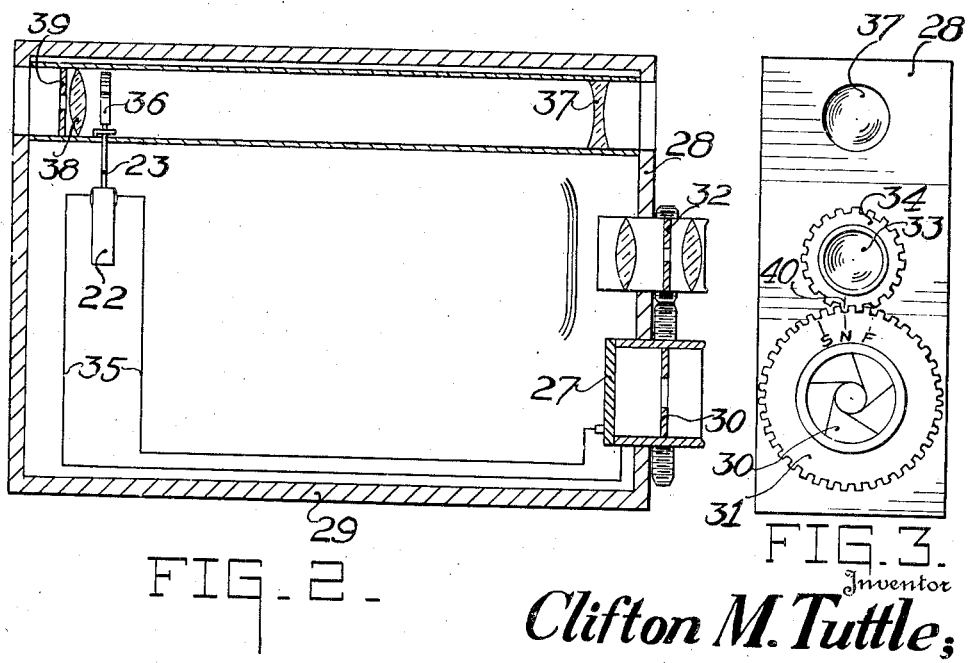
Fig. 2 is a diagrammatic view in section of a motion picture camera embodying a modification of the invention.
Fig. 3 is a front view of the camera of Fig. 2.

In the modification shown in Figures 2 and 3 a light sensitive cell 27 is carried in the front wall 28 of a motion picture camera 29 and is variably covered by a diaphragm 30. The opening of the diaphragm 30 is varied by rotation of a ring 31 and correspondingly varies the diaphragm 32 of the camera objective 33 by means of a suitable mechanical linkage such as meshing gears formed on the peripheries of the adjusting rings 31 and 34 for the diaphragms 30 and 32, respectively.

As was above described, the cell 27 is connected by leads 35 to an indicating meter 22 the pointer 23 of which carries a multi-colored vane 36 in the light path through the view finder consisting of a field lens 37 and an ocular 38 which may be properly masked by a fixed diaphragm 39. The color of the scene through the view finder depends upon the position of the vane 36 and consequently upon the output of the cell 27 and when the diaphragm 30 is adjusted so that the field through the finder is uncolored the diaphragm 32 in the objective lens will be properly adjusted.

If desired the linkage between the two diaphragms 30 and 32 may be adjustable to accommodate the device to different camera or film speeds and one convenient arrangement for doing so may consist in varying the mesh of the teeth on the rings 31 and 34. As is indicated in Fig. 3, different marks, S, N and F, carried by the ring may be selectively placed opposite an index mark 40 on the ring 34 when the objective 33 is placed on the camera. The marks S, N, and F may correspond to different camera speeds, different film speeds or a combination of the two.

My invention not only provides a very convenient and accurate adjustment of a camera diaphragm both before and during the time a series of exposures is being made but possesses the very real advantage of not requiring the eye to focus on a particular indicator since it becomes aware of the color change without effort.

In the interest of clearness, I have omitted from the drawing certain well known structural features of the camera, since their inclusion would complicate the drawing without aiding the ready understanding of the invention.

I have chosen certain embodiments as illustrative of the invention and it will be apparent that various other modifications may be made without departing from the spirit and scope of my invention.

What I claim as new and desire to secure by Letters Patent of the United States, is:

1. A photographic camera including an objective and a diaphragm, means for indicating when the diaphragm is at the proper opening comprising a light sensitive cell the response of which is proportional to the intensity of the light transmitted by the diaphragm, a view finder, and means controlled by the response of said cell for introducing a distinctive color change in the light path through said finder whenever said diaphragm is set at other than the proper opening.

2. A photographic camera including an objective lens and a view finder, an adjustable diaphragm for the objective lens, a light sensitive cell adapted to be activated in accordance with the intensity of the light passing through said objective, means for introducing a color change in the light transmitted by said view finder and an electric meter element connected to said cell for actuating said means.

3. A camera including an objective and a finder for viewing the scene to be photographed, a diaphragm for controlling the amount of light passing through said objective and means including a light sensitive device adapted to be activated in accordance with the intensity of the light passing through the objective for altering the color aspect of the light passed by said finder when the activation of said device departs from a predetermined desired value.

4. A photographic camera including a finder for viewing a subject to be photographed and a lens provided with an adjustable diaphragm, a light sensitive cell responsive to light coming from the subject, means for jointly controlling the size of the diaphragm opening and the intensity of the light falling on said cell and means connected to the cell and operable to introduce a color indication in the finder in accordance with the response of the cell.

5. A photographic camera including a finder for viewing a subject to be photographed, a lens and an adjustable diaphragm for the lens, a light-sensitive cell responsive to light coming from the subject, means for controlling the color aspect of the light passed by said finder, a meter element connected to the cell for actuating said means, means adjustable to obtain a predetermined color aspect in the light passed by said finder and coupling means between said adjustable means and said diaphragm.

CLIFTON M. TUTTLE.